(12) United States Patent
Ando

(10) Patent No.: US 10,769,273 B2
(45) Date of Patent: Sep. 8, 2020

(54) ELECTRONIC CONTROL UNIT

(71) Applicant: DENSO CORPORATION, Kariya, Aichi-pref. (JP)

(72) Inventor: Motonori Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 260 days.

(21) Appl. No.: 16/016,746

(22) Filed: Jun. 25, 2018

(65) Prior Publication Data

US 2019/0005232 A1 Jan. 3, 2019

(30) Foreign Application Priority Data

Jul. 3, 2017 (JP) .................................. 2017-130213

(51) Int. Cl.
*G06F 21/54* (2013.01)
*G06F 21/56* (2013.01)
*G06F 21/52* (2013.01)

(52) U.S. Cl.
CPC .............. *G06F 21/54* (2013.01); *G06F 21/52* (2013.01); *G06F 21/566* (2013.01); *G06F 2221/034* (2013.01)

(58) Field of Classification Search
CPC ......... G06F 9/3842–3848; G06F 21/52; G06F 21/54; G06F 21/566; G06F 2221/033; G06F 2221/034
See application file for complete search history.

(56) References Cited

U.S. PATENT DOCUMENTS 7,577,992 B2 8/2009 Abadi et al.
9,361,102 B2 6/2016 Tan et al.
2007/0255980 A1 11/2007 Endo et al.
2009/0055635 A1* 2/2009 Tani ...................... G06F 9/3844 712/241
2017/0331747 A1* 11/2017 Singh .................... H04L 47/323
2018/0225446 A1* 8/2018 Liu ...................... G06F 11/3466

FOREIGN PATENT DOCUMENTS

| EP | 2256659 A1 | 12/2010 |
| JP | 2006-106939 A | 4/2006 |
| JP | 2011-081501 A | 4/2011 |
| JP | 2011-123658 A | 6/2011 |

OTHER PUBLICATIONS

U.S. Appl. No. 16/016,736, filed Jun. 25, 2018, Ando.

* cited by examiner

*Primary Examiner* — Kevin Bechtel

(74) *Attorney, Agent, or Firm* — Posz Law Group, PLC

(57) ABSTRACT

An electronic control unit includes: a memory saving a program that has a call/return to/from a function represented as a control flow together with the function itself and a check instruction inserted in a program code of the program for checking whether the program code is executable based on the control flow. The electronic control unit may also include an input unit receiving an input of use frequency information indicative of a use frequency of the function; a measurement unit measuring a load of the electronic control unit; an execution object determiner determining the check instruction to be executed based on the use frequency information and the load; and an arithmetic unit executing the check instruction determined by the execution object determiner at a time of execution of the program.

9 Claims, 10 Drawing Sheets

| FUNCTION | FUNCTIONALITY | USE FREQ. INFORMATION |
|---|---|---|
| A | MAIN FUNCTION | SKIP NG |
| B | OBTAIN VEHICLE INFO | SKIP NG |
| C | SEND VEHICLE INFO | SKIP NG |
| D | RECEIVE INFO FROM OTHER VEHICLE | SKIP OK |
| E | ANALYZE RECEIVED INFO | SKIP OK |
| F | IDENTIFY RELATIVE POSITIONING OF OTHER VEHICLES IN PROXIMITY | SKIP OK |

FIG. 9

| FUNCTION | FUNCTIONALITY | FUNC. EXE. TIME CHANGE RATE | USE FREQ. INFORMATION |
|---|---|---|---|
| A | MAIN FUNCTION | LO | → SKIP NG |
| B | OBTAIN VEHICLE INFO | LO | → SKIP NG |
| C | SEND VEHICLE INFO | LO | → SKIP NG |
| D | RECEIVE INFO FROM OTHER VEHICLE | HI | → SKIP OK |
| E | ANALYZE RECEIVED INFO | HI | → SKIP OK |
| F | IDENTIFY RELATIVE POSITIONING OF OTHER VEHICLES IN PROXIMITY | MID | → SKIP OK |

FIG. 10

| FUNCTION | FUNCTIONALITY | USE FREQ. INFORMATION |
|---|---|---|
| A | MAIN FUNCTION | LO |
| B | OBTAIN VEHICLE INFO | LO |
| C | SEND VEHICLE INFO | LO |
| D | RECEIVE INFO FROM OTHER VEHICLE | HI |
| E | ANALYZE RECEIVED INFO | HI |
| F | IDENTIFY RELATIVE POSITIONING OF OTHER VEHICLES IN PROXIMITY | MID |

| CPU USE RATE (%) | USE FREQ. OF EXE. OBJ. FUNCTION |
|---|---|
| RATE ≤ 60% | ALL (HI, MID, LO) |
| 60% < RATE < 80% | MID, LO |
| RATE ≥ 80% | LO |

OF EXE. OBJ. FUNCTIONS OF
    CHECK INSTRUCTION

ELECTRONIC CONTROL UNIT

CROSS REFERENCE TO RELATED APPLICATION

The present application is based on and claims the benefit of priority of Japanese Patent Application No. 2017-130213, filed on Jul. 3, 2017, the disclosure of which is incorporated herein by reference.

TECHNICAL FIELD

The present disclosure generally relates to an electronic control unit (ECU) that is resistant to and/or tolerant of a buffer overflow attack, which may be more specifically applicable to the ECU in an in-vehicle system environment.

BACKGROUND INFORMATION

A buffer overflow attack is generally known as an attack in which an attacker's program is sent into a memory (e.g., memory stack) of a program that is currently in execution and leads to an execution of a malicious program resulting in a deprivation of system control from a legitimate controller/program. More practically, the attacker's program may change a return address of the executed program in the memory stack to obtain control for the deprivation of the system control.

Even though various countermeasure methods have already been proposed for coping with the buffer overflow attack, one of which is a control flow integrity technique or a CFI technique that checks and detects, before damage has actually been caused, a call/return address involving a call/return from one function to another function after permitting a change to the call/return address by the attacker. However, the check process of the CFI technique during an execution of the program is time consuming.

For resolution of such an issue, patent document 1, i.e., Japanese Patent No. 2011-8778, proposes, for example, a storage of a program instruction in a specific region of a storage (i.e., a memory) and masking of a target jump/return address of a jump/return process, which prevents the attacker from simply modifying the jump/return address for meaningfully overtaking a current operation/process, without causing overhead to the check process for checking the jump/return address.

Further, according to patent document 2, i.e., Japanese Patent No. 2011-123658, while reducing a time-related overhead and a spatial (i.e., memory address) overhead, an efficient address check is enabled in consideration of an inter-domain execution restriction when a function call and a function return are performed between a non-trusted domain or domains.

In view of all of the above, the present disclosure is advantageous due to the following reasoning. That is, the methods of patent document 1 are not applicable to the conventional CFI technique, because such methods are different from the conventional CFI technique.

With regard to the teachings of patent document 2, a function call/return within the non-trusted domain(s) is not included in the scope of checking, which may allow an execution of an unintended instruction string (i.e., an instruction string not intended by the programmer/systems engineer) or the like within the non-trusted domain(s) by an inappropriate function call/return.

SUMMARY

It is an object of the present disclosure to reduce and/or prevent an overhead of a check process during an execution of a program by using a CFI technique that does not depend on domains.

In one aspect of the present disclosure, an electronic control unit includes a memory configured to store, or save, a program that includes a call from and a return to a function respectively represented by and extractable as a control flow in the program, together with a check instruction inserted in a program code of the program for checking whether the program code is executable based on the extracted control flow. The electronic control unit may further include an input unit configured to receive an input of use frequency information indicative of a use frequency of the function. The electronic control unit may further include a measurement unit configured to measure a load, or an amount of load, of the electronic control unit. The electronic control unit may further include an execution object determiner configured to determine the check instruction to be executed based on the use frequency information and the load. The electronic control unit may further include an arithmetic unit configured to execute the check instruction determined by the execution object determiner at a time of, i.e., during, an execution of the program.

[Effects of the Present Disclosure]

According to the electronic control unit of the present disclosure, an overhead in a program execution is prevented by using the CFI technique that does not depend on domains.

BRIEF DESCRIPTION OF THE DRAWINGS

Objects, features, and advantages of the present disclosure will become more apparent from the following detailed description made with reference to the accompanying drawings, in which:

FIG. 9 is a table diagram of execution objects of the check instruction performed by the electronic control unit in a modification of the first embodiment of the present disclosure;

FIG. 10 is a table diagram of execution objects of the check instruction performed by the electronic control unit in a second embodiment of the present disclosure;

DETAILED DESCRIPTION

Hereafter, with reference to the accompanying drawings, the present disclosure is described with regard to a program generation method, a configuration, and functions of an electronic control unit implementing such a program.

The configuration of each of the embodiments described herein is non-limiting and open to a combination with other embodiments, unless otherwise indicated.

Although the following exemplary embodiments describe an in-vehicle electronic control unit used in a vehicle and a program written therein and executable by the electronic control unit, the electronic control unit and the program may be applicable for other purposes and implemented in other places besides a vehicle.

Configuration Shared by All Embodiments

Figure 1:
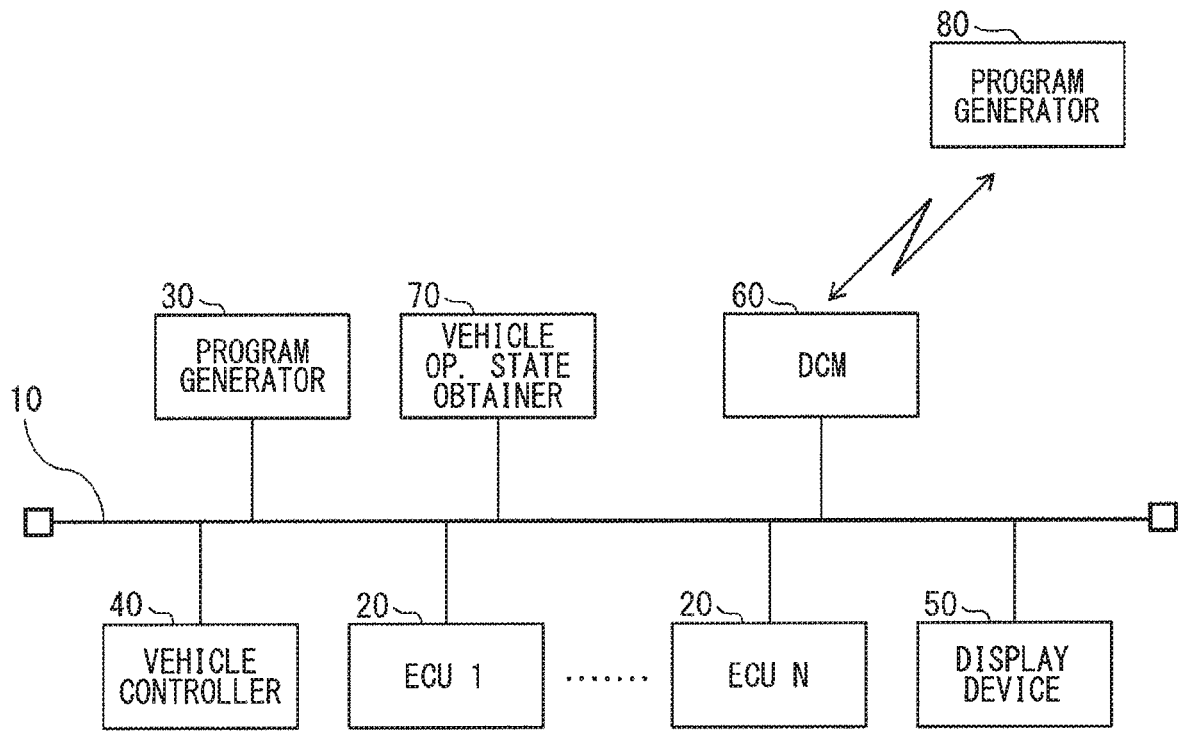
FIG. 1 is a block diagram of an arrangement of devices involving an electronic control unit and generation of a program that is implemented to the electronic control unit in a first embodiment of the present disclosure.

FIG. 1 shows a configuration, i.e., an arrangement of network devices, to serve as a base in each of the embodiments. That is, in an in-vehicle network 10 of an automobile, many devices such as N pieces of electronic control units (ECU) 20, a program generator 30, a vehicle controller 40, a display device 50, a data communication module (DCM) 60, and a vehicle operation state obtainer 70 are disposed and connected. Note that the program generator 30 may be stationarily connected to the network 10, or may be connected thereto as required or on demand by using a connector and a cable. Further, the program generator 30 may be replaced with a program generator 80 that is connectable to the network 10 wirelessly via the data communication module 60, either stationarily or as required.

First, a generation method of a program that is executed in or by the electronic control unit 20 of the present disclosure and the program generated by such method are described.

Figure 2:
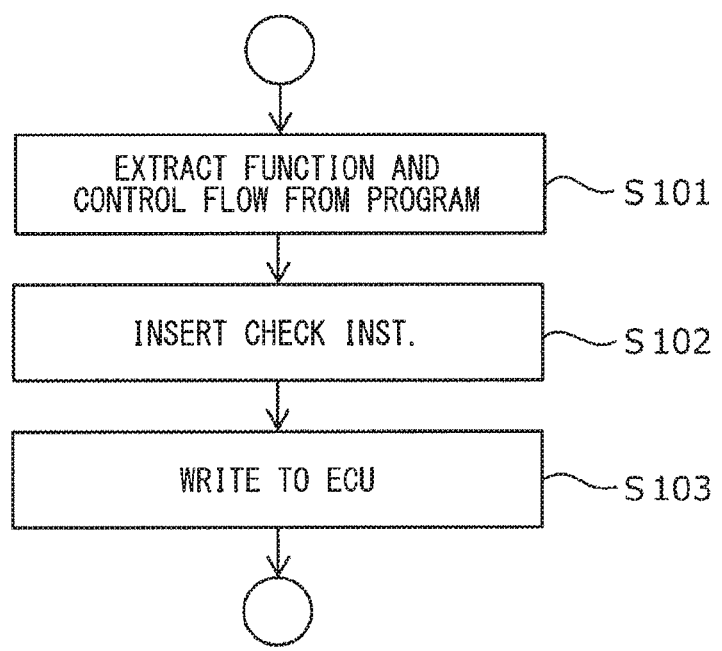
FIG. 2 is a flowchart regarding each step of a program generation method used in the electronic control unit in the first embodiment of the present disclosure.

FIG. 2 is a flowchart of the generation method of the program executed in the electronic control unit 20. The program executed in the electronic control unit 20 is generated by a general-purpose or specific, dedicated program generator 30, or by a program generator 80, which are shown in FIG. 1 and may include an arithmetic unit (CPU) and a memory (not shown). However, such a program may also be generated internally by the electronic control unit 20, in which the generated program is written.

First, a "function" in the "program code" of the program written in the electronic control unit 20 and a control flow which represents a call/return relationship of the function (S101) are extracted from the program code.

Here, the "program code" of the present disclosure may be a computer program written in a high-level language, a machine language, or an assembly language. Further, the "function" of the present disclosure may be either a function within the computer language itself (i.e., subroutine), or a method in general.

Figure 3:
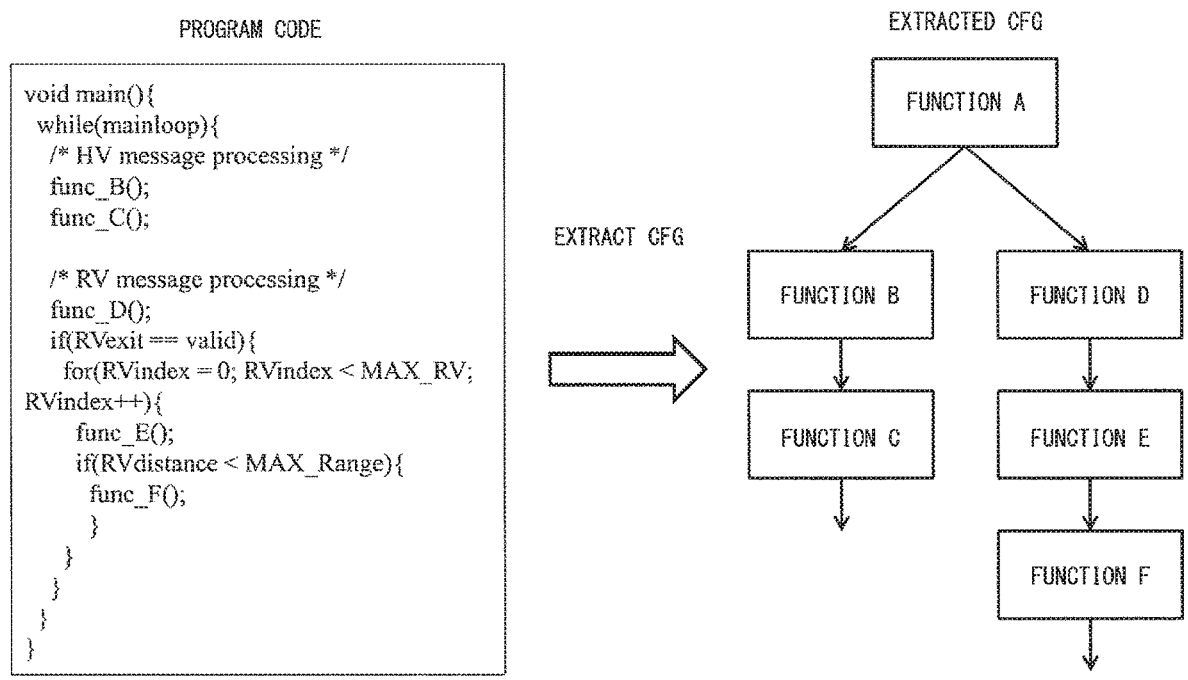
FIG. 3 is an illustration regarding an extraction step of the program generation method in the first embodiment of the present disclosure.

FIG. 3 shows the function and the control flow extracted from the program code as a control flow graph (CFG). In the example of FIG. 3, while functions A to F are extracted from the program code, the control flow which represents a call/return relationship of each function is also extracted from the program code.

Subsequently, a check instruction which checks and/or confirms whether a call/return of a function is properly performed, i.e., whether a control flow is properly performed, is inserted in the program code (S102). Although the check instruction checks all the control flows respectively at an inserted part/position, under specific conditions, it may check only a specific control flow among the control flows at the inserted part/position, which is later described.

Note that, although the check instruction in the present embodiment is inserted for checking all the control flows which constitute a program (i.e., a subject program), the check instruction may also be inserted for checking only a part of the control flows which constitute the program.

Here, an "insertion" of the check instruction in the present disclosure means, the check instruction as a written program statement in the program code, but may also mean an execution of the check instruction via a jump instruction jumping to a subroutine or to a module.

The program having such a program code in which such a check instruction is inserted is written in the electronic control unit 20 for the implementation of such checking (S103). The generated program is written in the electronic control unit (ECU) by which the generated program is executed via the in-vehicle network 10 or the DCM 60. The ECU in which the generated program is written and by which the generated program is executed may only be the electronic control unit 20 in a narrow sense, but may also be another information processing device or devices connected to the in-vehicle network 10, such as the vehicle controller 40, the display device 50, the DCM 60, and the like.

Figure 4:
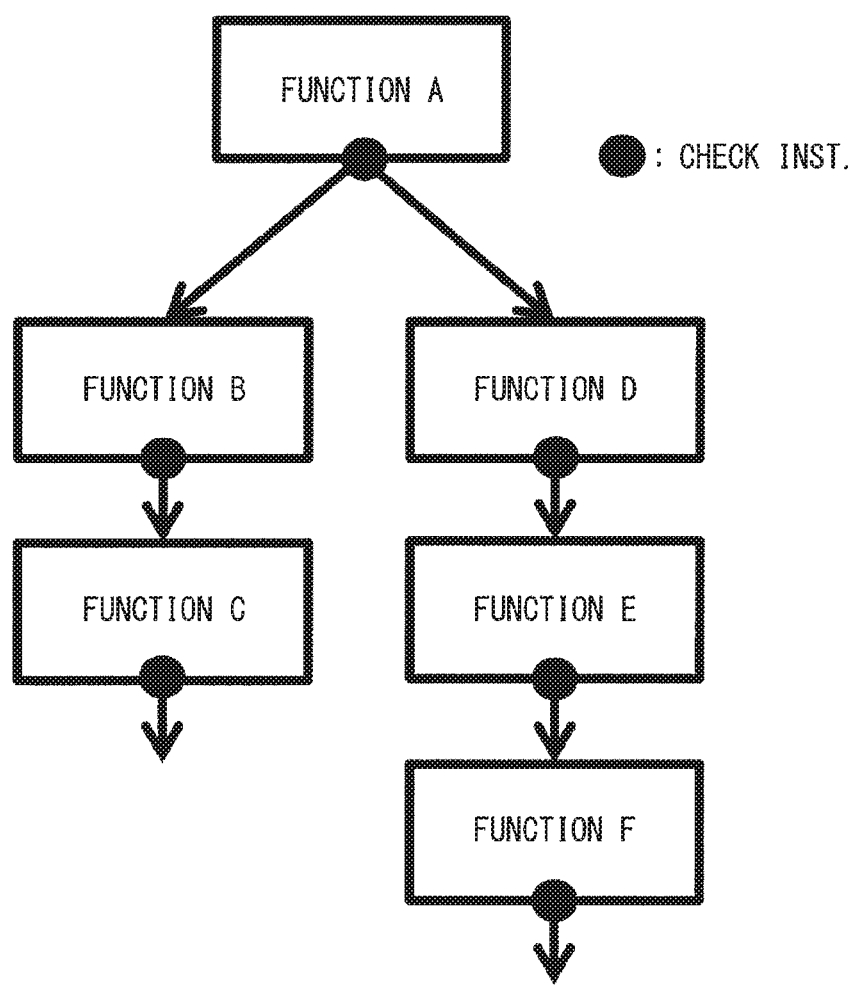
FIG. 4 is an illustration of a configuration of the program used in the electronic control unit in the first embodiment of the present disclosure.

FIG. 4 shows an illustration of a program in which the check instruction is inserted as a CFG. As shown in FIG. 4, the check instruction which performs a flow check process at the time of transition (i.e., a call) from one function to the other function is inserted in the program code for checking each of the transitions from functions A to F.

That is, the program (henceforth, the subject program) generated by the above-described method is a program which includes (i) the control flow (i.e., a "control flow" of the present disclosure) which represents a call/return relationship of functions A to F (i.e., a "function" of the present disclosure) and (ii) the functions A to F themselves, in the program code. Further, the program further includes the check instruction inserted in the program code of such program, which checks whether the control flow is properly performed/performable. That is, the check instruction checks whether the program code is executable based on the control flow.

Note that the check instruction may, for example, (a) execute a program when the check process compares a call/return destination (i.e., an address) of a to-be-executed program with a pre-recognized, correct/proper call/return destination (i.e., an address) of such program and determines a matching/agreement of the call/return destination from such comparison, or (b) abort the program upon determining a mismatch/non-agreement of the call/return destination. However, the check instruction may be different from such an instruction.

FIRST EMBODIMENT

A configuration of the electronic control unit 20 which implements the subject program is described with reference to FIG. 5. The electronic control unit 20 includes a memory 100 and a central processing unit (CPU) 200.

The memory 100 saves/stores the subject program. According to the present embodiment (i.e., the first embodiment), the memory 100 saves, in addition to the subject program, (i) an execution object table which specifies use frequency information which is described later and (ii) thresholds of a CPU use rate (i.e., it corresponds to a "load threshold" of the present disclosure), and such information is set in advance by a "user" of the electronic control unit.

Here, the "load threshold" of the present disclosure may be a specific amount of load, or may also be a load of variable value, which is calculable according to an environment, or to a condition, by using a preset arithmetic calculation, for example. Further, the load threshold may be a single value, or may be a plurality of values. Further, the "user" of the present disclosure, for example, may not be limited to a dealer or a manufacturer of a vehicle having the electronic control unit of the present disclosure, but may also be a manufacture of the electronic control unit.

An input unit 201 of the central processing unit 200 receives, from the memory 100 or the in-vehicle network 10, an input of the use frequency information that "shows and/or indicates" "use frequency" of each of the functions constituting the subject program. In the present embodiment (i.e., the first embodiment), the input unit 201 receives an input of the execution object table which specifies the use frequency information and the threshold of the CPU use rate from the memory 100 which saves this information.

Here, the "use frequency" of the present disclosure may mean the number of times the function is executed, or may also be a total execution time (e.g., the CPU time for execution) of the function, the use rate of the function, the change rate of the number of executions (i.e., execution frequency) of the function, and the like, i.e., may be any value indicative of a degree of use of the function, in terms of how frequently the function is used during a certain period of time. Further, "indicate and/or show" in the present disclosure may mean a direct indicator of use of the function as well as an indirect indicator thereof, including relevant information and the like, defining a correlation between such information and the use frequency.

In the present embodiment (i.e., the first embodiment), the use frequency information of a function for which the checking of a control flow is not performed under a specific condition (i.e., which is described later), by skipping the check instruction may be considered indicative of "skip OK (skippable)" (i.e., "skippability information" in the present disclosure). The use frequency information of a function for which the checking of a control flow is performed even under the specific condition without skipping the check instruction may be considered as indicative of "skip NG (unskippable)" (i.e., "unskippability information" in the present disclosure). Further, which one of "skip OK" and "skip NG" is indicated by the use frequency information is determinable based on whether or not the use frequency of a relevant function depends on external environment information regarding an "external environment" of the vehicle in which the electronic control unit 20 is disposed. In the present embodiment, when the use frequency of a function changes according to the external environment information, the use frequency information indicates "skip OK", and, when the use frequency of a function does not change according to the external environment information, i.e., the use frequency of a function is constant and unaffected by the external environment information, the use frequency information indicates "skip NG".

That is, the use frequency information of the present embodiment (i.e., the first embodiment) is information which shows a correlation between the external environment information and the use frequency of a function.

Here, the "external environment" of the present disclosure may mean an environment external to the subject vehicle, for example, indicating the number of vehicles traveling around the subject vehicle, the weather/environment around the subject vehicle, and the like.

Figures 5, 6:
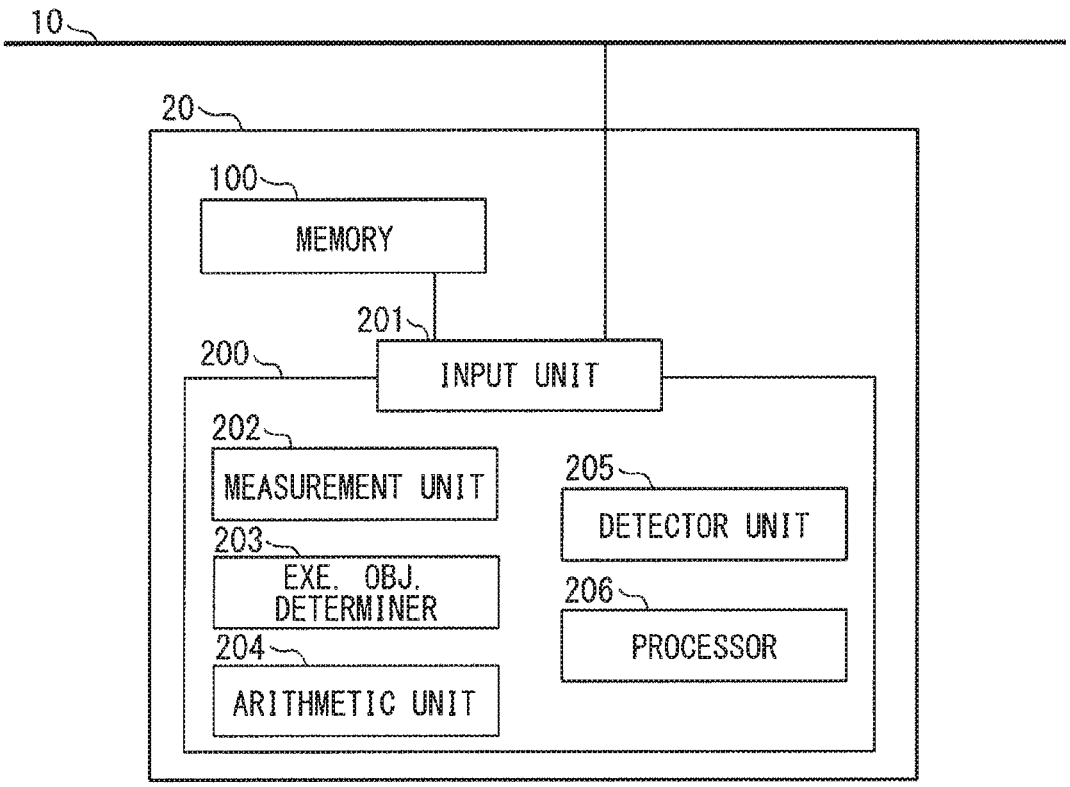
FIG. 5 is a block diagram of the electronic control unit in the first embodiment of the present disclosure.
FIG. 6 is a table diagram of execution objects of a check instruction performed by the electronic control unit in the first embodiment of the present disclosure.

FIG. 6 shows an example of the execution object table in the present embodiment. Functions A to F in the example are, respectively, functions extracted from the program code of the program for a vehicle-to-vehicle communication, among which function A is a main function, function B is a function that obtains subject vehicle information to be transmitted to other vehicles, function C is a function that transmits the subject vehicle information to the other vehicles, function D is a function that receives the information from the other vehicle, function E is a function that analyzes the received information, and function F is a function that identifies relative positioning of the other vehicles existing within a preset distance from the subject vehicle (i.e., IDENTIFY RELATIVE POSITIONING OF OTHER VEHICLES IN PROXIMITY in FIG. 6). The identification of relative positioning mentioned above may mean, for example, that the other vehicle may be identified either as an on-coming vehicle, a crossing vehicle (i.e., running perpendicular in front of or behind the subject vehicle), or an alongside vehicle (i.e., running parallel or adjacent to the subject vehicle), based on a travel direction and/or a position of the subject vehicle. Additionally, the other vehicle may be identified as either traveling directly in front of (e.g., the same lane as the subject vehicle), laterally in front of (e.g., in front of the subject vehicle in an adjacent lane), directly behind (e.g., same lane as the subject vehicle), or laterally behind the subject vehicle (e.g., behind the subject vehicle in an adjacent lane).

The vehicle performing a vehicle-to-vehicle communication receives information by wireless communications from the other vehicle(s). Further, whenever receiving the information from the other vehicle which travels around (i.e., in proximity of) the subject vehicle, the process of function D, function E, and function F is repeatedly executed in the subject vehicle. That is, in other words, the use frequency of these functions is changing according to the number of other vehicles around the subject vehicle, which is an "external environment," i.e., depending on the external environment. Therefore, the use frequency information of the functions D, E, and F respectively indicates "skip OK."

On the other hand, the subject vehicle performs function B for obtaining position information of the subject vehicle at preset intervals, and performs function C for transmitting the subject vehicle information to the other vehicle(s). That is, the use frequency of function B and function C is always constant, i.e., it does not depend on the "external environment." Therefore, the use frequency information of function B and function C indicates "skip NG."

Note that, since function A, i.e., a main function, is a function that is always performed at the time of executing the program and has a constant use frequency, the use frequency information of function A indicates "skip NG."

A measurement unit 202 measures a use rate (i.e., a CPU use rate, hereafter) of the central processing unit 200 as a "load" of the electronic control unit 20.

Here, the "load" in the present disclosure may be, for example, a direct indicator of the CPU load, such as the CPU use rate, the number of received packets, a user operation amount, or the like, or may also be an indirect indicator of the CPU load, such as the temperature of the CPU, a heat generation amount thereof, or the like.

An execution object determiner 203 "determines" a check instruction or instructions to be actually and/or selectively executed from among the inserted check instructions inserted in the program code, "based on" the use frequency information input to the input unit 201 and the CPU use rate measured by the measurement unit 202.

More specifically, the execution object determiner 203 compares the CPU use rate measured by the measurement unit 202 with the threshold of the CPU use rate saved in the memory 100. As a result of the comparison, when the measured CPU use rate is lower "than" the threshold of the CPU use rate, the execution object determiner 203 determines that all of the check instructions inserted in the program code should be executed.

On the other hand, when the measured CPU use rate is higher "than" the threshold of the CPU use rate, the execution object determiner 203 determines that only the check instruction or instructions which check the control flow of the function having the use frequency information of "skip NG" defined in the execution object table should be executed.

In the present embodiment (i.e., the first embodiment), the function having the "skip NG" use frequency information is function A, function B, and function C, as shown in the execution object table of FIG. 6. Therefore, the execution object determiner 203 determines that the check instruction which checks a control flow that includes function A, function B, and/or function C either as a caller function (i.e., a return destination of a call) or a callee function (a destination of a call).

Here, a determination "based on" in the present disclosure may mean a determination of the check instruction to be executed by using, i.e., with reference to, the use frequency information and the load, which is open to a determination scheme that considers other factors other than the use frequency information and the load. Further, the "determination" of the check instruction in the present disclosure may mean an eventual determination of such instruction to be executed as a result of processing, for example.

Further, the load higher/lower "than" the threshold of the load may either mean that the load is equal to or higher/lower than the threshold, or that the load is simply higher/lower than the threshold (i.e., <, >, OR may also be ≤, ≥). The same applies to the following description.

The arithmetic unit 204 executes (i) the check instruction determined by the execution object determiner 203 at the time of execution of the subject program, and (ii) the subject program itself.

Figure 7:
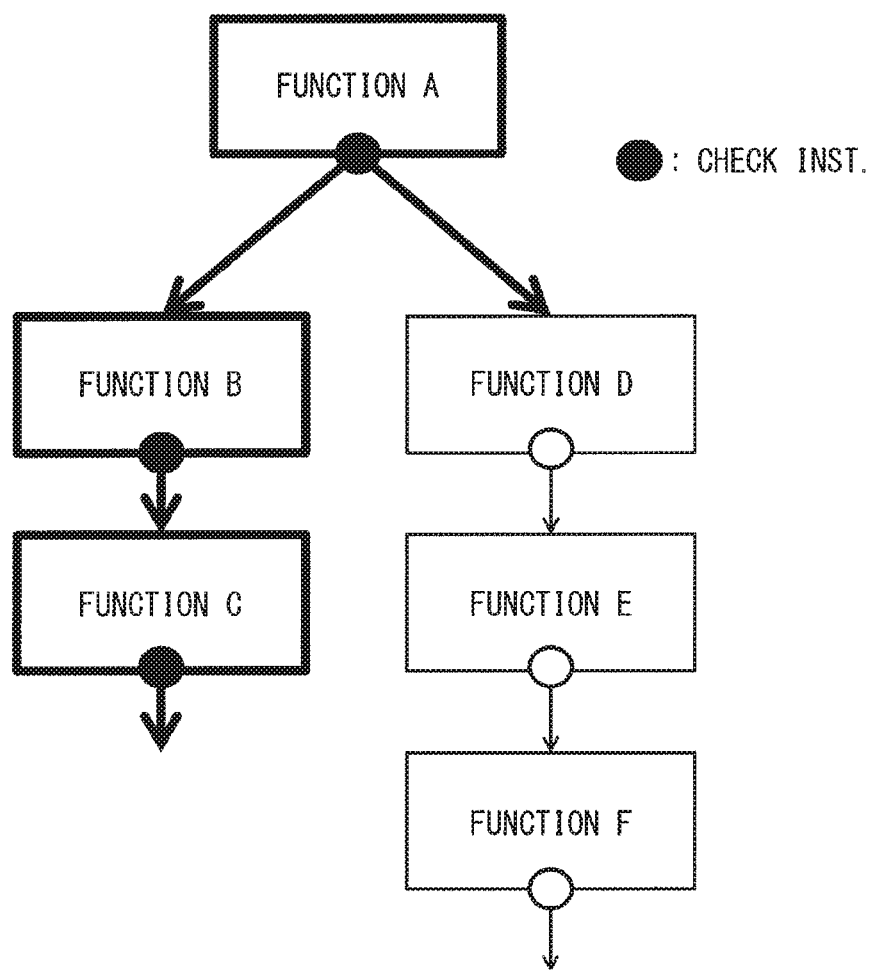
FIG. 7 is another illustration of a configuration of the program used in the electronic control unit in the first embodiment of the present disclosure.

FIG. 7 shows an illustration of the program to be executed when the measured CPU use rate is higher than the threshold of the CPU use rate as a CFG. In order to check the control flow representing a call/return relationship of functions A, B, and C respectively having "skip NG" as the use frequency information, a transition from either function A, B or C to the other function or back is checked by performing a check process (i.e., by the check instruction). Note that, in FIG. 7, a large black dot (i.e., filled circle) represents a check instruction to be executed (i.e., an execution object instruction), and a white circle (i.e., unfilled circle) represents a check instruction that is not going to be executed (i.e., a non-execution object).

A detector unit 205 monitors an output of the executed check instruction when the instruction is executed during an execution of the subject program, and detects an abnormality of the control flow. More specifically, the detector unit 205 compares a pre-recognized, correct/proper call/return destination with the call/return destination in the subject program scheduled to be executed, and detects an abnormality by examining whether those destinations are in agreement with each other.

A processor 206 performs a "predetermined process" based on the detection result of the detector unit 205. For example, when a detection result shows an abnormality, the processor 206 stops the execution of the subject program. Alternatively, the processor 206 may notify a user of such an abnormality by using the display device 50, or may save an execution log of the subject program. When safely aborting the subject program is difficult, it may be advisable to abort/reset the subject program after performing a safety measure/process, e.g., after stopping the travel/drive of the subject vehicle.

Here, the "predetermined process" in the present disclosure may mean a preset, fixed process, or the like, or may mean a process that has variable contents that are variably performable depending on a condition.

Figure 8:
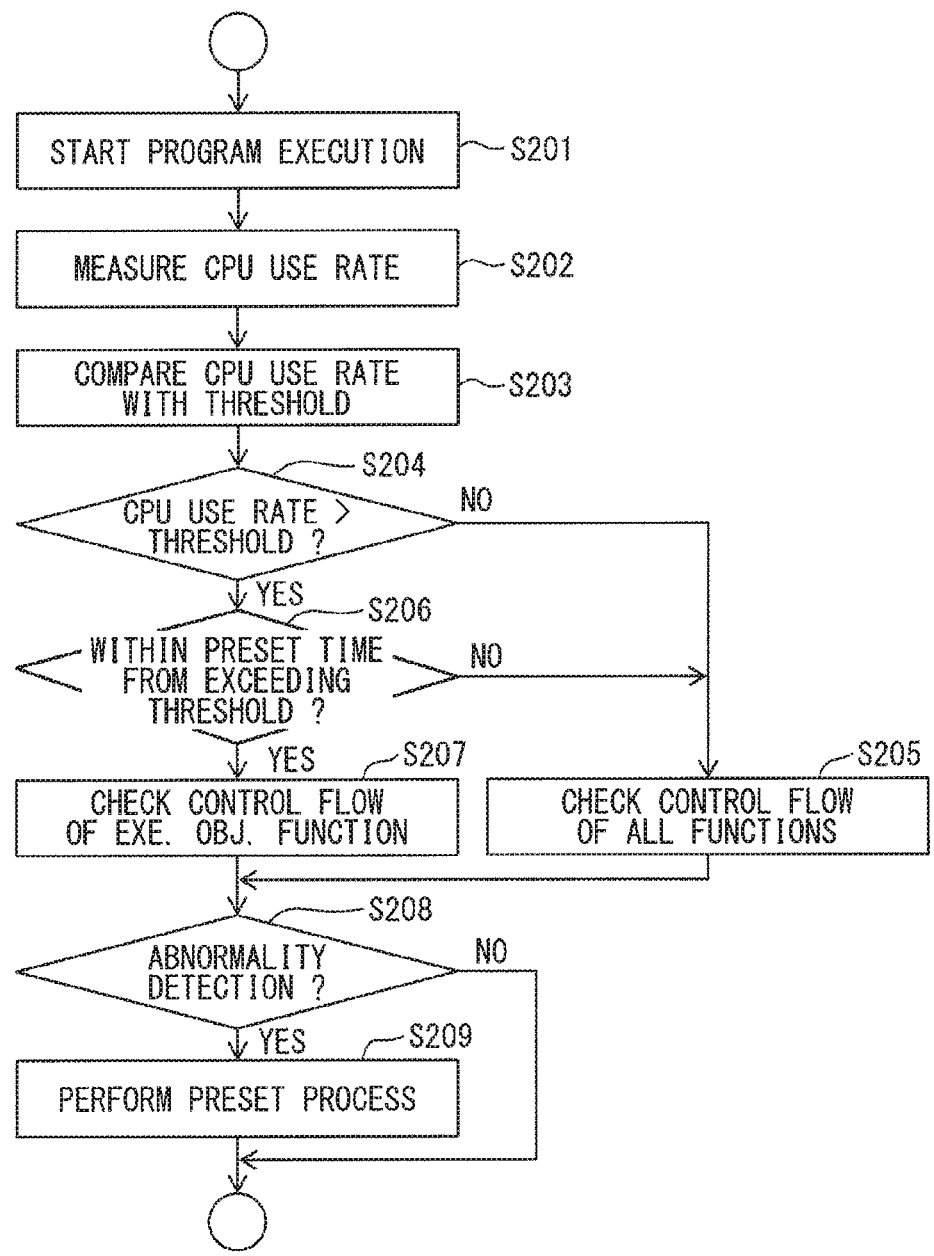
FIG. 8 is a flowchart of an operation of the electronic control unit in the first embodiment of the present disclosure.

Next, an operation of the electronic control unit 20 is described with reference to FIG. 8.

At S201, the arithmetic unit 204 of the central processing unit 200 reads the subject program saved in the memory 100, and starts execution of the subject program.

At S202, the measurement unit 202 measures the CPU use rate of the electronic control unit 20, which executes the subject program. Then, at S203, the execution object determiner 203 compares the measured CPU use rate with the threshold of the CPU use rate saved in the memory 100.

At S204, when the execution object determiner 203 determines that the measured CPU use rate is lower than the threshold of the CPU use rate (i.e., NO at S204), the execution object determiner 203 determines all of the check instructions inserted in the program code as an execution object, and the arithmetic unit 204 executes all of the check instructions determined above as the execution object, as S205.

When the execution object determiner 203 at S204 determines, on the other hand, that the measured CPU use rate is higher than the threshold of the CPU use rate (i.e., YES at S204), at S206, the execution object determiner 203 determines whether a lapse time after having the higher-than-threshold CPU use rate is within a preset time length. Here, when the lapse time is determined as greater than the preset time length (i.e., NO at S206), the execution object determiner 203 determines all of the check instructions inserted in the program code as an execution object, and the arithmetic unit 204 executes all of the check instructions determined above as the execution object at S205.

On the other hand, when the lapse time is determined as being within the preset time length at S206 (i.e., YES at S206), the execution object determiner 203 determines, as the execution object, only the check instruction(s) for checking the control flow regarding the function with the "skip NG" use frequency information, and the arithmetic unit 204 executes only the check instruction(s) determined above as the execution object at S207.

The reason why the lapse time after having the higher-than-threshold CPU use rate is examined as to being within the preset time length at S206 is that, when a high CPU use rate is continuing, it puts the program in a less-strictly checked state (i.e., checking "skip NG" function only). That is, continuation of a less-secure state of the program is avoided as a precaution by checking a continuation time of such state, i.e., an execution object limited state in which execution objects of the check instruction are limited in number. Thus, the security of the program execution is maintained at a high level.

At S208, the detector unit 205 monitors the output of the executed check instruction during the execution of the subject program, and detects an abnormality of the call/return of the function.

When the detector unit 205 detects an abnormality at S208 (i.e. YES at S208), the processor 206 of the central processing unit 200 performs, at S209, the "predetermined process" such as aborting the subject program, or the like. When an abnormality is not discovered/detected (i.e., NO at S208), the execution of the subject program is continued.

In an external environment that has many process objects to be processed by the subject program, the process amount of the electronic control unit increases in proportion to the number of process objects, thereby possibly leading to an increase in the processing load of the electronic control unit, which may be represented as the CPU use rate or the like. Further, when there are so many process objects of the subject program, the use frequency increases as the number of calls of the function increases, thereby leading to an increase in processing overhead for performing the check process.

Therefore, when the load of the electronic control unit increases to be higher than a certain value, by excluding the control flow(s) for the function(s) having the external-environment-dependent use frequency from the execution object, the execution objects of the check instruction are limited or reduced, and, while performing the security check of the control flow, increases in the overhead for performing the check process are limited and/or prevented.

(Modification 1)

According to the above-described first embodiment, use frequency information indicates either "skip NG" or "skip OK" depending on whether the use frequency of a function is dependent on the external environment information.

However, based on elements other than the dependability/dependency of the use frequency of a function on the external environment information, the use frequency information "skip NG" or "skip OK" may change.

For example, based on the change rate of the execution frequency (i.e., the number of execution times, or how many times a certain function/module is executed per unit time) of a function according to the external environment information or to a change thereof, the use frequency information may indicate "skip NG" or "skip OK."

In the modification 1, when the change rate of the execution frequency of a function according to the environment information is lower than a "predetermined" change rate, the use frequency information indicates "skip NG," and, when the change rate of the execution frequency of a function is higher than a "predetermined" change rate, the use frequency information indicates "skip OK."

Here, a "predetermined" value of change rate in the present disclosure may mean a certain, fixed/stationary value, or may mean a condition-dependent value, which is, even though condition dependent, a uniquely-determinable value once a condition is determined.

FIG. 9 shows an example of the execution object table in the modification 1, in which the same functions, i.e., functions A to F in the first embodiment, are extracted. Therefore, in terms of the execution frequency, function A, i.e., a main function, function B, i.e., a function that obtains subject vehicle information to be transmitted to the other vehicles, and function C, i.e., a function that transmits the subject vehicle information to the other vehicles are all non-dependent on the external environment, i.e., the execution frequency of functions A to C is substantially constant. In other words, the change rate of the execution frequency of functions A to C according to the external environment information is low (FUNC. EXE. TIME CHANGE RATE:LO for FUNCTIONS A, B, C, as shown in FIG. 9).

On the other hand, in terms of the execution frequency, function D, i.e., a function that receives the information from the other vehicle(s) and function E, i.e., a function that analyzes the received information are dependent on the external information, which typically increases according to an increase of the number of the other vehicles. That is, in other words, the change rate of the execution frequency of functions D and E, the external environment information, is high (FUNC. EXE. TIME CHANGE RATE:HI for FUNCTIONS D, E, as shown in FIG. 9).

Further, the execution frequency of function F, i.e., a function that identifies the relative positioning of the other vehicles existing within a preset distance from the subject vehicle, is somewhat dependent on the external environment, i.e., somewhat increases according to an increase of the number of the other vehicles. However, the number of other vehicles that transmit information to the subject vehicle is not necessarily equal to the number of the other vehicles existing within a preset distance from the subject vehicle. Therefore, the change rate of the execution frequency of function F according to the external environment information may be higher than the change rate of functions A, B, and C, but may be lower than the change rate of functions D & E, i.e., the change rate of function F may be in between low and high (FUNC. EXE. TIME CHANGE RATE:MID for FUNCTION F, as shown in FIG. 9)

Therefore, the use frequency information (USE FREQ. INFORMATION in FIG. 9) for functions A, B, and C, whose change rate of the execution frequency is lower than a predetermined change rate, is set as "skip NG", and the use frequency information for functions D & E & F, whose change rate of the execution frequency is higher than a predetermined change rate, is set as "skip OK."

Alternatively, by setting a higher change rate than the above-described rate, the change rate of the execution frequency of function F, which is higher than the change rate of the execution frequency of functions A, B, C, but lower than the change rate of the execution frequency of functions D, E, may be set to "skip NG" as the use frequency information.

(Modification 2)

In the above-mentioned embodiment (i.e., the first embodiment), the use frequency information is set in advance by the user as shown by the execution object table in FIG. 6. However, the use frequency information may be updated based on an actual use situation of the electronic control unit.

In addition to the configuration shown in FIG. 5, in the present modification (i.e., modification 2), the central processing unit 200 is further provided with a use frequency calculator. The use frequency calculator calculates, in real time, the use frequency of each function which constitutes the subject program during the execution of the subject program by the arithmetic unit 204. Further, based on the real-time use frequency calculated by the use frequency calculator, the contents of the use frequency information defined in the execution object table are updated.

Even when the CPU use rate of the electronic control unit increases, which may make the CPU use rate measured by the measurement unit 202 exceed a threshold of the CPU use rate, the actually-measured use frequency of a certain function may not increase in some cases. In such case, even if the scope of the execution objects of the check instruction is limited, the overhead control and/or prevention effect by such limitation may be low.

Therefore, by calculating real-time use frequency of the functions in the program and reflecting such an actual, real-time use frequency to the use frequency information, the use frequency information of each of the functions in the program may be updatable, i.e., may be dynamically used to set either of "skip NG" or "skip OK."

For example, in the example shown in FIG. 6, the use frequency information of functions A, B, and C is set as "skip NG," and the use frequency information of functions D, E, and F is set as "skip OK." However, when an actual use frequency of functions D, E, and F calculated by the use frequency calculator is low, the use frequency information of these functions may be set as "skip NG" either in part or as a whole.

In the present modification, due to utilization of the dynamically-calculated, actual use frequency of the function, the execution object of the check instruction is determinable in real time, and in such manner, a more efficient overhead control (i.e., limiting and/or preventing an overhead increase) may be performed.

SECOND EMBODIMENT

According to the first embodiment, the execution object determiner 203 determines the execution object of the check instruction by using, i.e., referring to, the use frequency information indicating either of "skip NG" or "skip OK." According to the present embodiment (i.e., the second embodiment), the execution object is determined by using the use frequency information which indicates the use frequency of a function. Note that the following description omits the configuration shared with the first embodiment, while focusing on the differences therefrom.

In the memory 100 of the present embodiment (i.e., the second embodiment), an execution object table, a threshold of a CPU use rate, and a threshold of the use frequency (i.e., "use frequency threshold" in the present disclosure) are saved in addition to the subject program. Further, the execution object table, the threshold of the CPU use rate, and the threshold of use frequency are respectively input to the input unit 201.

Here, the "use frequency threshold" in the present disclosure may mean a certain, specific use frequency, or may mean a use frequency that is variable depending on a condition. Further, the use frequency threshold may be a single value, or two or more values.

FIG. 10 shows an example of the execution object table which defines the use frequency information in the second embodiment. In the present embodiment, the use frequency information indicates, instead of simply indicating "skip NG" or "skip OK," a use frequency of a function either as "high (HI)", "middle (MID)", or "low (LO)," based on an assumption that the function, i.e., the subject vehicle with the subject program utilizing such function, is put in an external environment that has many (e.g., a very high number of) execution objects involving the relevant function. However, the use frequency information may also be represented by a numerical value, i.e., as the number of calls of a function per unit time, for example.

As described above with regard to the first embodiment, the use frequency of functions A, B, and C may not depend on the external environment, i.e., is constant, and thereby the use frequency information indicating the use frequency of those functions is defined as "low (LO)."

On the other hand, the change rate of the execution frequency of functions D and E according to the external environment information may be high. Therefore, in an external environment where many program execution objects are found, the use frequency of functions D and E is expected to be high. Therefore, the use frequency information indicating the use frequency of these functions is defined as "high (HI)."

Further, the use frequency of function F for identifying the relative position relationship between the subject vehicle and the other vehicle(s) existing within a preset distance from the subject vehicle is considered to be higher than the use frequency of functions A, B, and C, but considered lower than the use frequency of functions D and E, and thereby the use frequency information indicative of the use frequency of function F is defined as "middle (MID)."

The execution object determiner 203 in the second embodiment compares the threshold of the CPU use rate measured by the measurement unit 202 with the CPU use rate saved in the memory 100, just like the first embodiment. Then, when the measured CPU use rate is higher than the threshold of the CPU use rate, the execution object determiner 203 determines the execution object of the check instruction based on the use frequency information defined in the execution object table.

Here, the execution object determiner 203, unlike the one in the first embodiment, compares the threshold of the use frequency saved in the memory 100 with the use frequency of a function shown as the use frequency information defined in the execution object table. Then, a check instruction that checks a control flow involving a function or functions having the use frequency lower than the threshold of the use frequency is determined as an execution object.

For example, when a use frequency threshold of "low (LO)" or a numerical value indicative of "low (LO)" use frequency is saved in the memory 100, the execution object determiner 203 determines whether to execute only the check instruction(s) which check(s) the control flow of functions A, B, and C having a "lower-than-low" threshold use frequency set as the use frequency information, According to the present embodiment (i.e., second embodiment), the setting of the use frequency information is definable in a more detailed manner, i.e., more specifically definable than the two grades/options of "skip NG" and "skip OK," and as such, the execution object of the check instruction may be determined more efficiently.

THIRD EMBODIMENT

In the first and second embodiments, when the load of the electronic control unit 20 exceeds the load threshold set in advance, the check process functions that checks the control flow of function(s) having "skip NG" use either frequency information or a lower-than-threshold use frequency set as the use frequency information, to determine an execution object.

On the other hand, in the present embodiment (i.e., the third embodiment), a configuration of changing the execution object of the check instruction according to the load of the electronic control unit is described.

Figures 11, 12:
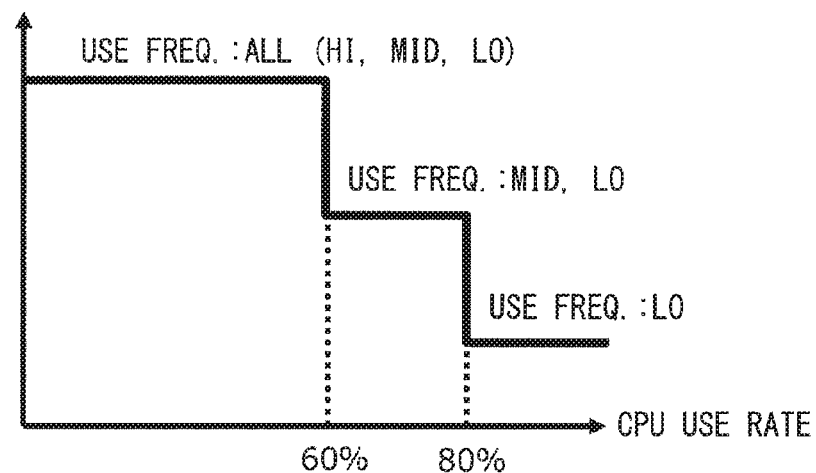
FIG. 11 is a table diagram of a relationship between load and use frequency of functions in the third embodiment of the present disclosure.
FIG. 12 is a graph of a relationship between load and use frequency of functions in the third embodiment of the present disclosure.

FIG. 11 and FIG. 12 show a CPU use rate and a corresponding use frequency or frequencies set for the functions. In such example, two CPUs use rate thresholds, i.e., a first CPU uses a first rate threshold (60%) and a second CPU uses a second rate threshold (80%), which are set in advance. The functions in the control flow which are checked by an execution of the check instruction are categorized into three groups, i.e., levels, based on the first and second CPU use rate thresholds mentioned above. That is, three levels, i.e., a level less than or equal to the first CPU use rate threshold (i.e., use rate≤60%), a level in between the first and second CPU use rate thresholds (i.e., 60<use rate<80%), and a level greater than or equal to the second CPU use rate threshold (i.e., use rate ≥80%), are defined.

Figure 13A:
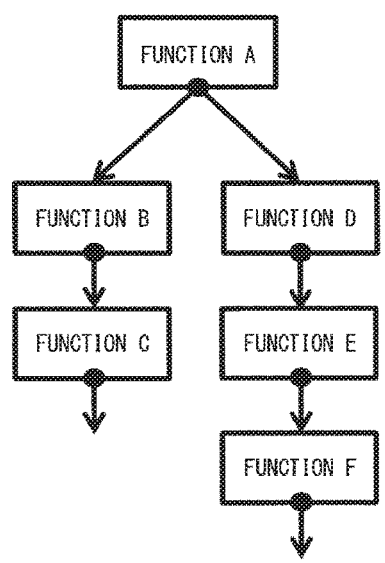
FIG. 13A is an illustration of a configuration of the program used in the electronic control unit in the third embodiment of the present disclosure.

For example, when the CPU use rate measured by the measurement unit 202 is equal to or lower than 60%, i.e., equal to or lower than the first CPU use rate threshold, the execution object determiner 203 determines that all of the check instructions inserted in the program code should be executed, i.e., determines all instructions as an execution object irrespective of the use frequency information. FIG. 13A illustrates a configuration of the program executed in such case.

Figure 13B:
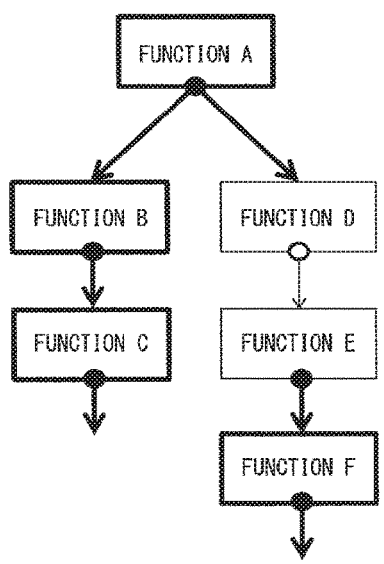
FIG. 13B is an illustration of a configuration of the program used in the electronic control unit in the third embodiment of the present disclosure.

On the other hand, when the CPU use rate is between the first CPU use rate threshold (60%) and the second CPU use rate threshold (80%), the execution object determiner 203 determines, as shown in FIG. 13B, that the check instruction which checks the control flow with functions having "middle (MID)" or "low (LO)" use frequency information should be executed, e.g., executes the control flow(s) including functions A, B, C, and F, as designated by use frequency information shown in FIG. 10, either as a caller function or a callee function. That is, the execution object determiner 203 determines such control flow(s) as an execution object.

Figure 13C:
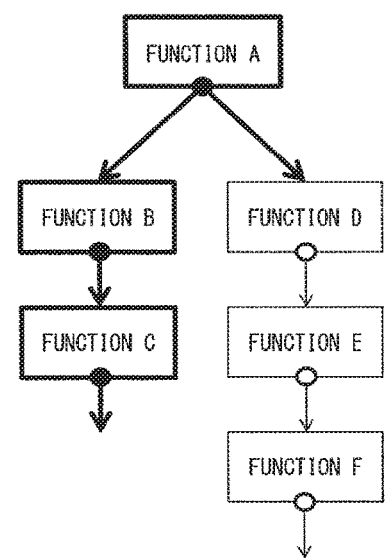
FIG. 13C is an illustration of a configuration of the program used in the electronic control unit in the third embodiment of the present disclosure.

Further, when the CPU use rate is equal to or greater than the second CPU use rate threshold (80%), the execution object determiner 203 determines, as shown in FIG. 13C, that only the check instruction(s) with control flow(s) involving the function(s) having "(LO)" use frequency information should be executed, e.g., including functions A, B, and C, as designated by use frequency information shown in FIG. 10, either as a caller function or a callee function. That is, the execution object determiner 203 determines such control flow(s) as an execution object.

In other words, in the present embodiment (i.e., the third embodiment), when the CPU use rate is higher than the first CPU use rate threshold, the execution object determiner 203 excludes the check instruction that checks the control flow involving a function having "high (HI)" use frequency as the use frequency information from the execution object, and, when the CPU use rate further increases to be equal to or exceed the second CPU use rate threshold, the execution object determiner 203 excludes the check instruction that checks the control flow involving a function having "middle (MID)" use frequency as the use frequency information from the execution object in addition to the exclusion of the control flow involving "high (HI)" use frequency function (s). That means, as the CPU use rate increases, a check instruction is excluded from the execution object in a descending order of use frequency of the function, i.e., a high use frequency "checker" instruction excluded first, then middle use frequency "checker" instruction excluded next, and so on.

Figure 14:
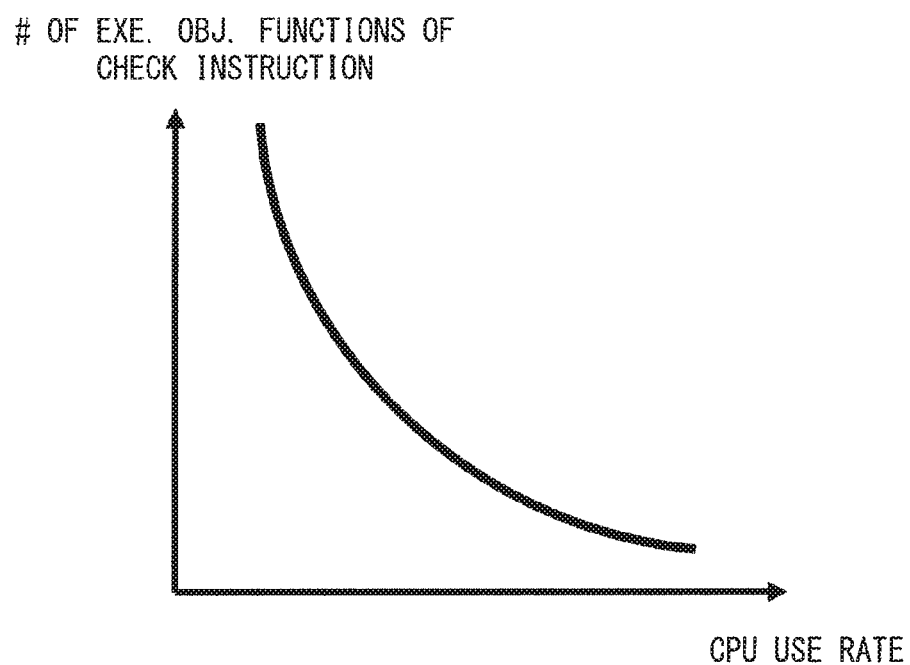
FIG. 14 is a diagram of a relationship between load and use frequency of functions in the third embodiment of the present disclosure.

Note that two CPU use rate thresholds utilization scheme shown in FIG. 11 and FIG. 12 to limit the execution object check instructions in two steps may be expanded to a more gradually-changing exclusion scheme, i.e., to the one shown in FIG. 14, in which the execution object determiner 203 is configured to gradually limit/narrow the scope of the checked control flows to be checked by the check instruction, by initially excluding the check instruction that checks high use frequency functions, as the CPU use rate measured by the measurement unit 202 increases.

According to the present embodiment, the check object functions (i.e., functions to be checked by the check instruction by way of checking the control flow) are limited according to an increase of the CPU use rate, i.e., according to an increase in the load of the ECU, and as such, the increase in overhead may be efficiently prevented and/or limited.

SUMMARY

In the above, the features of the electronic control unit of the present disclosure are described respectively as separate embodiments.

Now, the features of one embodiment may be combined with the features of other embodiments, i.e., without being specifically limited to each embodiment. That is, for example, the check instruction to be executed may be determined according to the combined configurations of the first to third embodiments.

Further, as for the use frequency information, the use frequency information, which is described above as indicative of a correlation between the external environment information and the use frequency of a function, may also be information that does not depend on the external environment information, as long as such information represents the use frequency of the function(s). For example, when a loop function is included in the functions of the subject program, the use frequency information may indicate the number of loop times (i.e., iterations) as the use frequency.

Further, the configurations and the methods of each of the embodiments described above may be factored into elements, combined, and/or configured to appropriately serve as the present disclosure. That is, the elements described in each of the embodiments described above are not strictly limited to the above-described arrangement of such elements, and different configurations and arrangements may be contemplated.

INDUSTRIAL APPLICABILITY

Although the present disclosure may be mainly applicable to the electronic control unit used in vehicles, it may also be used and applicable to other devices, such as two-wheel vehicles, electric-assist bicycles, vessels, airplanes, and the like. Further, applicability of the present disclosure is not limited to the transportation device described above.

Although the present disclosure has been fully described in connection with embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. An electronic control unit comprising:
a memory configured to save a program that includes a call from a function and a return to the function respectively represented by and extractable as a control flow in the program, together with a check instruction inserted in a program code of the program for checking whether the program code is executable based on the extracted control flow;
an input unit configured to receive an input of use frequency information indicative of a use frequency of the function;
a measurement unit configured to measure a load of the electronic control unit;
an execution object determiner configured to determine execution of the check instruction based on the use frequency information and the load; and
an arithmetic unit configured to execute the check instruction as determined by the execution object determiner at a time of execution of the program.

2. The electronic control unit of claim 1 further comprising:
a detector unit configured to detect an abnormality regarding the call and the return of the function by monitoring an output of the check instruction; and
a processor configured to perform a preset process based on a detection result of the detector unit.

3. The electronic control unit of claim 1, wherein
the ECU is disposed in a vehicle, and wherein
the use frequency information is a correlation between (i) external environment information for an external environment of the vehicle and (ii) the use frequency of the function.

4. The electronic control unit of claim 3, wherein
the memory is further configured to save a load threshold, and wherein
the use frequency information is either (i) unskippability information indicating that the check instruction is unskippable, when the use frequency of the function does not change according to the external environment information, or (ii) skippability information indicating that the check instruction is skippable, when the use frequency of the function changes according to the external environment information, and wherein
the execution object determiner is further configured to determine, by comparing the load with the load threshold and when having a comparison result that the load is higher than the load threshold, execution of the check instruction when the check instruction checks the control flow for the function having unskippability information as the use frequency information.

5. The electronic control unit of claim 1, wherein
the memory is further configured to save a load threshold, and wherein
the use frequency information is either (i) unskippability information indicating that the check instruction is unskippable when the use frequency of the function is lower than a preset use frequency, or (ii) skippability information indicating that the check instruction is skippable when the use frequency of the function is higher than the preset use frequency, and wherein
the execution object determiner is further configured to determine, by comparing the load with the load threshold and when having a comparison result that the load is higher than the load threshold, execution of the check instruction when the check instruction checks the control flow for the function having unskippability information as the use frequency information.

6. The electronic control unit of claim 1, wherein
the memory is further configured to save a load threshold and a use frequency threshold, and wherein
the execution object determiner determines, by comparing the load with the load threshold and when having a comparison result that the load is higher than the load threshold, execution of the check instruction when the check instruction checks the control flow involving the function having the use frequency in the use frequency information being lower than the use frequency threshold.

7. The electronic control unit of claim 1, wherein
the execution object determiner is further configured to exclude, from the execution object, the check instruction that checks the control flow of the function in a descending order of the use frequency of the function indicated by the use frequency information, as an amount of the load increases.

8. The electronic control unit of claim 1, wherein
the use frequency information is set in advance.

9. The electronic control unit of claim 1 further comprising:
a use frequency calculator configured to calculate the use frequency of the function at an execution time of the program, wherein
the use frequency information is updated based on the use frequency calculated by the use frequency calculator.

* * * * *